(12) United States Patent
Sandacz et al.

(10) Patent No.: US 9,233,354 B1
(45) Date of Patent: Jan. 12, 2016

(54) SEALING SYSTEM FOR A FLUID CATALYST CRACKING REGENERATOR

(71) Applicant: UOP LLC, Des Plaines, IL (US)

(72) Inventors: Michael S. Sandacz, Glen Ellyn, IL (US); Michael A. Stine, Lake Zurich, IL (US); Mark A. La Vine, Carol Stream, IL (US); Melvin Paden, Kalispell, MT (US); Patrick D. Walker, Park Ridge, IL (US); James W. Althoff, Wilmette, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/448,146

(22) Filed: Jul. 31, 2014

(51) Int. Cl.
*B01J 8/08* (2006.01)
*B01J 19/00* (2006.01)
*B01J 8/24* (2006.01)
*B01J 38/12* (2006.01)
*B01J 8/00* (2006.01)
*F27D 99/00* (2010.01)

(52) U.S. Cl.
CPC .............. *B01J 19/0073* (2013.01); *B01J 8/008* (2013.01); *B01J 8/24* (2013.01); *B01J 38/12* (2013.01); *F27D 99/0073* (2013.01); *B01J 2208/00495* (2013.01); *B01J 2208/00938* (2013.01)

(58) Field of Classification Search
CPC .......... B01J 19/0073; B01J 8/008; B01J 8/24; B01J 38/12; B01J 2208/00495; F27D 99/0073; F27D 2009/0081
See application file for complete search history.

(56) References Cited

U.S. PATENT DOCUMENTS

| 2,663,580 A | 12/1953 | Shirk |
| 5,063,028 A | 11/1991 | Humble et al. |
| 5,328,667 A | 7/1994 | Johnson |

FOREIGN PATENT DOCUMENTS

| EP | 0289991 A2 | 11/1988 |
| EP | 0324286 B1 | 8/1992 |
| KR | 10-0936692 B1 | 1/2010 |

*Primary Examiner* — Lessanework Seifu
(74) *Attorney, Agent, or Firm* — James C. Paschall

(57) ABSTRACT

A regenerator for an FCC apparatus. The regenerator includes a riser inside of a shell. The riser includes a cone and a cone skirt. An annulus is formed between the riser and the shell. A sealing system for keeping catalyst out of a portion of the annulus comprises a first sealing element and a second sealing element disposed above the second sealing element. The second sealing element comprises a ring having one or more plates being movable to accommodate the thermal expansion of the riser.

20 Claims, 9 Drawing Sheets

SEALING SYSTEM FOR A FLUID CATALYST CRACKING REGENERATOR

FIELD OF THE INVENTION

This invention relates generally to a fluid catalyst cracking (FCC) apparatus, and more particularly to a sealing system used in a regenerator for an FCC apparatus.

BACKGROUND OF THE INVENTION

Catalytic cracking is accomplished by contacting hydrocarbons in a reaction zone with a catalyst composed of finely divided particulate material. The reaction in catalytic cracking, as opposed to hydrocracking, is carried out in the absence of added hydrogen or the consumption of hydrogen. As the cracking reaction proceeds, substantial amounts of coke are deposited on the catalyst. The catalyst is regenerated at high temperatures by burning coke from the catalyst in a regeneration zone. Coke-containing catalyst, referred to herein as "spent catalyst", may be continually transported from the reaction zone to the regeneration zone to be regenerated and replaced by essentially coke-free regenerated catalyst from the regeneration zone. Fluidization of the catalyst particles by various gaseous streams allows the transport of catalyst between the reaction zone and regeneration zone.

One such regeneration zone is disclosed in U.S. Pat. No. 7,906,077, the entirety of which is incorporated herein by reference. The regeneration zone typically comprises a regenerator vessel that includes an outer shell and an internal riser. The internal riser is typically attached to the outer shell. However, given the extreme high temperatures that occur inside of the regenerator vessel, the riser will expand. Therefore, there is typically an annulus or void between the outer shell and the internal riser. In order to avoid catalyst from filing this void, one or more seals are used to keep the annulus relatively free from catalyst.

One known sealing system is shown in U.S. Pat. No. 5,328,667 in which a primary seal is disposed between the outer shell and the internal riser. A cone-shaped metal ring is disposed on the internal riser above the primary seal and contacts with a metal plate on the shell. The cone-shaped metal ring is welded to the riser and comprises a single piece. While these designs may be effective, it is believed that such a configuration may have some drawbacks.

For example, it has been observed that the weld between the riser and the ring has a tendency to crack as a result of the extreme temperatures in the internal riser and the weight of catalyst on top of the ring. Additionally, the design of the cone-shaped ring does not easily allow for inspection of the primary seal. Similarly, the design of the cone-shaped ring does not allow for easy removal of any catalyst that has accumulated under ring.

Therefore, there remains a need for an effective and efficient design for sealing an annulus between an internal riser and an outer shell in an FCC regenerator.

SUMMARY OF THE INVENTION

A first aspect of the invention may be characterized as a regenerator for regenerating catalyst from an FCC reactor. The regenerator includes an internal riser comprising a cone and a cone skirt, a shell surrounding the internal riser and forming an annulus between an outer surface of the riser and an inner surface of the shell, a bottom of the cone skirt secured to the shell, a primary seal disposed in the annulus between the internal riser and the shell, and, a secondary seal disposed above the primary seal. The secondary seal comprises a sealing ring including at least one plate being movable, preferably being pivotable.

In some embodiments, the sealing ring forms a cone. In other embodiments, the sealing ring forms a plate.

In at least one embodiment, the secondary seal also includes an outer seal support ring secured to the inner surface of the shell. The outer seal support ring forms a lap joint with the at least one pivotable plate. It is contemplated that the secondary seal further includes an inner seal support ring secured to the outer surface of the riser. It is contemplated that the inner seal support ring includes at least one post, and that the at least one pivotable plate includes an aperture to receive the at least one post. The at least one post forms a pivot for the at least one pivotable plate. It is also contemplated that the inner seal support ring includes plurality of posts, and the secondary seal comprises a plurality of plates. Accordingly, each plate includes an aperture to receive a post.

In some embodiments, the at least one pivotable plate includes at least one handle.

In a second aspect of the present invention, the invention may be characterized as a regenerator for regenerating catalyst from an FCC reactor. In this aspect the regenerator includes an internal riser comprising a cone and a cone skirt, a shell surrounding the internal riser and forming an annulus between an outer surface of the internal riser and an inner surface of the shell, a bottom of the cone skirt secured to the shell, a primary seal disposed in the annulus between the internal riser and the shell, and, a secondary seal disposed above the primary seal. The secondary seal comprises a sealing ring formed with a plurality of plates and an inner seal support ring secured to the outer surface of the riser. The plates and the inner support seal form a lap joint.

In some embodiments, the plates from the plurality of plates are fastened together in a moveable relationship.

In at least one embodiment, the plates form lap joints with adjacent plates. Additionally, it is contemplated that the plates form a cone.

In at least one embodiment, at least one of the plates includes at least one handle.

In some of the embodiments, the secondary seal also includes an outer seal support ring secured to the inner surface of the shell. The outer seal support ring forms a lap joint with the plates. It is contemplated that the inner seal support ring is disposed on the outer surface of the internal riser so that an inner circumference of the sealing ring is in contact with and forms a junction with the internal riser. It is further contemplated that the inner seal support ring is disposed on the outer surface of the internal riser to form a lap joint with a bottom surface of the sealing ring.

In at least one embodiment of the present invention, the plates of the sealing ring includes an annular flange. It is contemplated that the plates of the sealing ring are secured to the inner seal support ring and the flanges of the plates are secured to the outer seal support ring. It is further contemplated that the flange of the sealing ring and the outer seal support ring are secured with a fastener and an elastic member is disposed between the flange and the outer seal support ring.

Additional objects, embodiments, and details of the invention are set forth in the following detailed description of the invention.

DETAILED DESCRIPTION OF THE DRAWINGS

DETAILED DESCRIPTION OF THE INVENTION

An FCC regenerator has been developed in which a sealing system between the outer shell and an internal rise that solve some, if not all, of the drawbacks noted above. For example, one or more embodiments, provides a sealing system that allows for easy access to inspect the primary seal, as well as remove any catalyst accumulated thereon. Additionally, one or more embodiments provides a sealing system that accommodates the thermal expansion exhibited by the internal riser.

Figure 1:
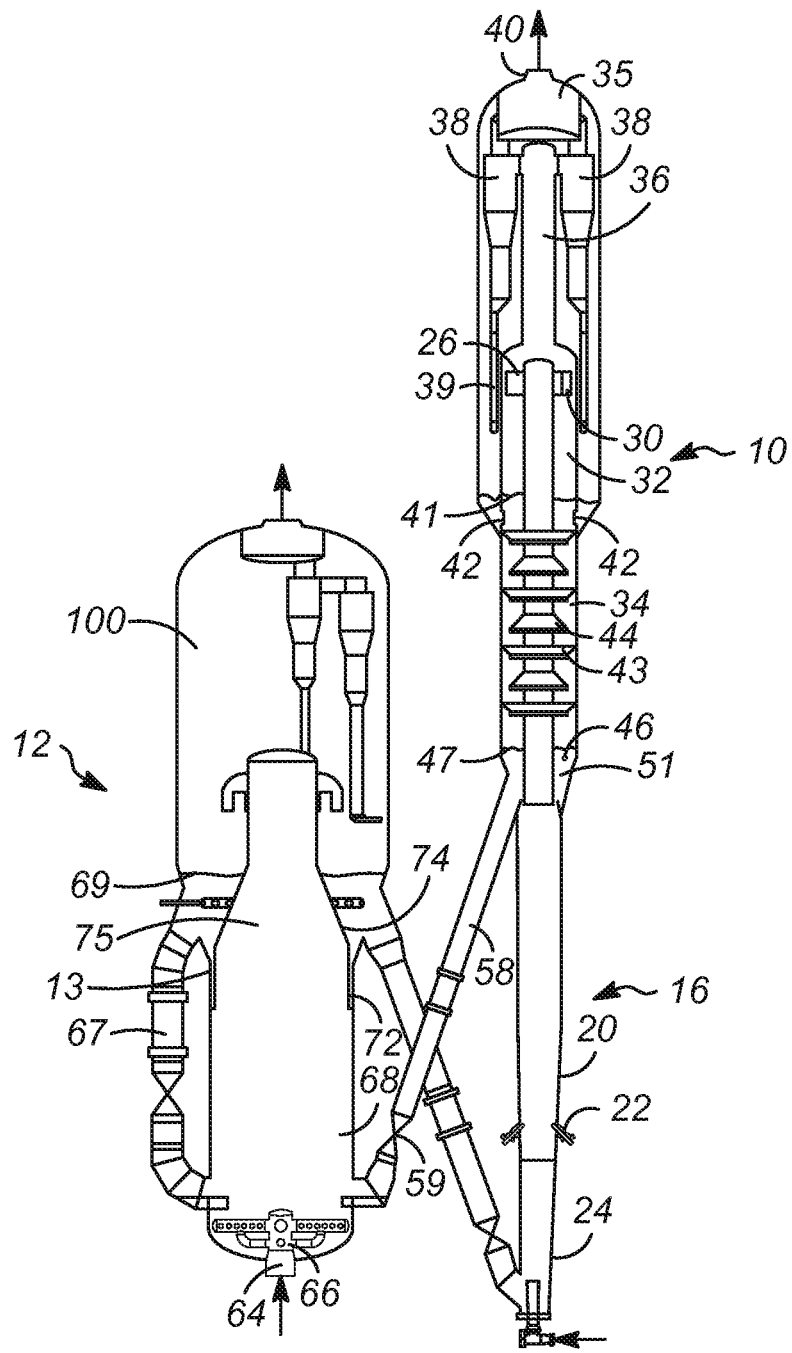
FIG. 1 is a schematic arrangement of a FCC apparatus that may be used in accordance with the present invention.

These and other benefits will be appreciated and understood more fully in the context of an FCC apparatus, such as the one shown in FIG. 1. The description of this invention in the context of the specific process arrangement shown is not meant to limit it to the details disclosed therein.

The FCC apparatus shown in FIG. 1 comprises a reactor vessel 10, a regenerator vessel 12 with an outer shell 13, and a reactor riser 16 that provides a pneumatic conveyance zone in which conversion takes place. The arrangement circulates catalyst and contacts feed in the manner hereinafter described.

The catalyst comprises any of the well-known catalysts that are used in the art of fluidized catalytic cracking, such as an active amorphous clay-type catalyst and/or a high activity, crystalline molecular sieve. Molecular sieve catalysts are preferred over amorphous catalysts because of their much-improved selectivity to desired products. Zeolites are the most commonly used molecular sieves in FCC processes. Preferably, the first catalyst comprises a large pore zeolite, such as a Y-type zeolite, an active alumina material, a binder material, comprising either silica or alumina and an inert filler such as kaolin. A catalyst additive may comprise a medium or smaller pore zeolite catalyst exemplified by ZSM-5, ZSM-1, ZSM-12, ZSM-23, ZSM-35, ZSM-38, ZSM-48, and other similar materials. U.S. Pat. No. 3,702,886 describes ZSM-5.

FCC feedstocks, suitable for processing by this invention, include conventional FCC feeds and higher boiling or residual feeds. The most common of the conventional feeds is a vacuum gas oil which is typically a hydrocarbon material having a boiling range of from 343° C. to 552° C. (650° F. to 1025° F.) and is prepared by vacuum fractionation of atmospheric residue. Heavy or residual feeds, i.e., boiling above 499° C. (930° F.), are also suitable. The FCC process of the present invention is suited best for feed stocks that are heavier than naphtha range hydrocarbons boiling above about 177° C. (350° F.).

Returning to FIG. 1, the reactor riser 16 provides a conversion zone for cracking of the feed hydrocarbons. The reactor riser 16 may have an outer shell 20 or wall. The reactor riser 16 typically operates with dilute phase conditions above the point of feed injection wherein the density is usually less than 320 kg/m$^3$ (20 lb/ft$^3$) and, more typically, less than 160 kg/m3 (10 lb/ft3). Feed is introduced into the reactor riser 16 by one or more nozzles or distributors 22 between an entrance 24 to the reactor riser 16 and substantially upstream from an outlet 30. Volumetric expansion resulting from the rapid vaporization of the feed as it enters the reactor riser 16 further decreases the density of the catalyst within the reactor riser 16 to typically less than 160 kg/m3 (10 lb/ft3). Before contacting the catalyst, the feed will ordinarily have a temperature in a range of from 149° C. to 316° C. (300° F. to 600° F.). Additional amounts of feed may be added downstream of the initial feed point.

The catalyst and reacted feed vapors are then discharged from the top of the reactor riser 16 through the outlet 30 and separated into a cracked product vapor stream including cracked products and a collection of catalyst particles covered with substantial quantities of coke and generally referred to as "spent catalyst." In an effort to minimize the contact time of the products with the catalyst which may promote further conversion of desired products to undesirable other products, any arrangement of separators may be used to remove spent catalyst from the product stream quickly.

For example, although not required for the practicing of the present invention, a swirl arm arrangement 26 may be provided at the end of the reactor riser 16 which can further enhance initial catalyst and cracked hydrocarbon separation by imparting a tangential velocity to the exiting catalyst and cracked product vapor stream mixture. The swirl arm arrangement 26 may be located in an upper portion of a disengaging chamber 32. The disengaging chamber 32 is in downstream communication with the outlet 30. A stripping zone 34 may be situated in the lower portion of the disengaging chamber 32. Catalyst separated by the swirl arm arrangement 26 drops down into the stripping zone 34.

The cracked product vapor stream, comprising cracked hydrocarbons and some spent catalyst, exits the disengaging chamber 32 via a conduit 36 which is in upstream communication with one or more cyclones 38. The cyclones 38, in downstream communication with the outlet 30 via the conduit 36, remove remaining catalyst particles from the product vapor stream to reduce particle concentrations to very low levels. The product vapor stream may then exit the top of the reactor vessel 10 through an outlet 40 via a plenum chamber 35. Any catalyst separated by the cyclones 38 may return to the reactor vessel 10 through one or more dipleg conduits 39 into a dense bed 41 where the spent catalyst will enter the stripping zone 34 in the disengaging chamber 32 through openings 42.

The stripping zone 34 removes hydrocarbons entrained with the spent catalyst and hydrocarbons adsorbed on the surface of the catalyst by counter-current contact with an inert gas such as steam. Various baffles 43, 44 may facilitate contact of the steam with the spent catalyst. Other stripping internals may be suitable. Inert gas enters the stripping zone 34 through a line 46. A bed 47 of stripped catalyst may accumulate at the base of the stripping zone 34 which can be designated a distribution zone 51 in the disengaging chamber 32.

Spent, stripped catalyst is transported to the regenerator vessel 12 of the regeneration zone, for example, through a spent catalyst conduit 58 in downstream communication with the distribution zone 51. The rate of transportation of catalyst may be regulated by a control valve 59. The control valve 59 may also be used to control the depth of the catalyst bed 47 in the stripping zone 34

On the regeneration side of the process, the spent catalyst which is transferred to the regenerator vessel 12, via the conduit 58, undergoes a typical combustion of coke from the surface of the catalyst particles by contact with an oxygen-containing gas. The regenerator vessel 12 may be a combustor-type of regenerator, which may use hybrid turbulent bed-fast fluidized conditions in a high-efficiency regenerator vessel 12 for completely regenerating spent catalyst. However, other regenerator vessels and other flow conditions may be suitable for the present invention.

The reactor conduit 58 feeds spent catalyst to a first or lower chamber 68. The spent catalyst from the reactor vessel 10 usually contains carbon in an amount of from 0.2 to 2 wt-%, which is present in the form of coke. An oxygen-containing combustion gas, typically air, enters the first chamber 68 of the regenerator 12 through a conduit 64 and is distributed by a distributor 66. Openings in the distributor 66 emit combustion gas. As the combustion gas contacts spent catalyst, it typically lifts the catalyst under fast fluidized flow conditions. The lifted catalyst may have a catalyst density of from 48 to 320 kg/m$^3$ (3 to 20 lb/ft$^3$) and the combustion gas may have a superficial gas velocity of 1.1 to 2.2 m/s (3.5 to 7 ft/s) in the first chamber 68. The oxygen in the combustion gas contacts the spent catalyst and combusts carbonaceous deposits from the catalyst to at least partially regenerate the catalyst and generate flue gas.

The mixture of catalyst and flue gas in the first chamber 68 ascend through a cone skirt 72 to a cone 74 which together form an internal riser 75 of the regenerator vessel 12. As, the mixture of catalyst passes into the cone 74 of the riser 75, the gas accelerates because of the reduced cross-sectional area of the cone 74. The superficial gas velocity will usually exceed about 2.2 m/s (7 ft/s). The density of the catalyst in the riser 75 is typically less than about 80 kg/m3 (5 lb/ft3). Due to the combustion of the coke occurring within the first chamber 68, the riser 75 typically has a temperature (during normal operation mode) of about 732° C. to 760° C. (1350° F. to 1400° F.). On the other hand, the outer shell 13 typically has a temperature between approximately 93.3° C. to 200° C. (200° F. to 400° F.).

Hot regenerated catalyst from a dense catalyst bed 69 in an upper or second chamber 100 may be recirculated into the first chamber 68, for example, via an external recycle standpipe 67 regulated by a control valve to raise the overall temperature of the catalyst and gas mixture in the first chamber 68. Additionally, regenerated catalyst which has passed from the internal riser 75 to the upper chamber 100 may be transported back to the reactor vessel 10, as is known, for example in U.S. Pat. No. 7,906,077 and is not necessary for understanding the present invention.

Figure 2:
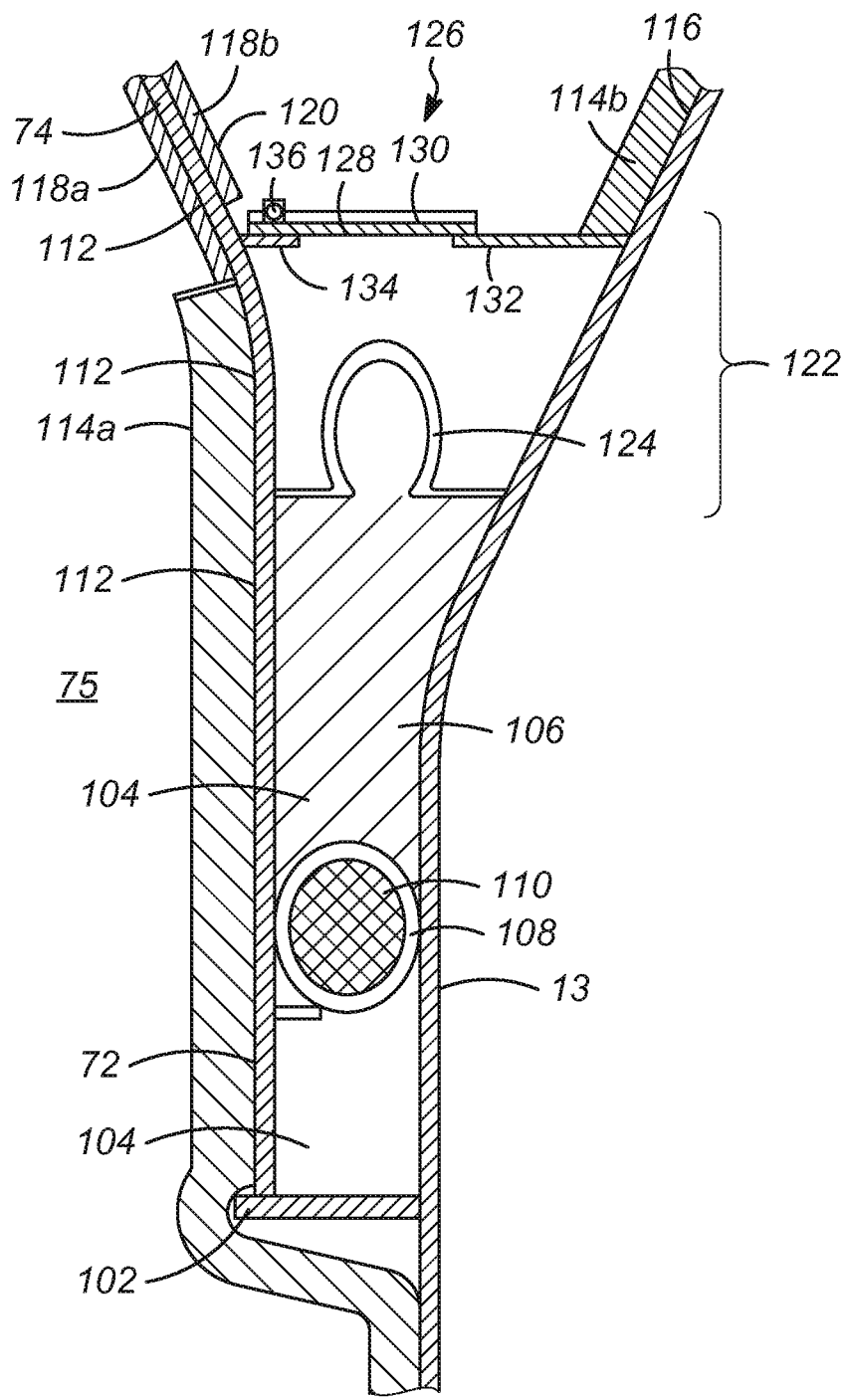
FIG. 2 is a side cutaway view of a sealing system according to one or more embodiments of the present invention.

As can be seen in FIG. 2, the cone skirt 72 of the internal riser 75 may be supported by a support ring 102 secured to the outer shell 13 of the regenerator vessel 12. Other attachment configurations are contemplated.

The cone skirt 72 is typically sized smaller than the outer shell 13 such that an annulus 104, or empty space, is formed between the cone skirt 72 and the outer shell 13. However, the annulus 104 is not necessary empty. For example, a retaining element 108, such as a braided stainless steel hose 110, may be secured to the cone skirt 72, the shell 13, or both to hold insulation 106 in at least a portion of the annulus 104.

In order to create a gradual temperature gradient along the length of the internal riser 75, an inner surface 112 of the internal riser 75 includes a refractory lining 114*a*. Additionally, a portion of an inner surface 116 of the outer shell 13 may also include a refractory lining 114*b*. Furthermore, an inner surface the internal riser 75 may also include an abrasion resistant lining 118*a*. An outer surface 120 of the internal riser 75 may also include an abrasion resistant lining 118*b*. The abrasion resistant lining 118*a* protects the riser 75 from erosion.

In order to minimize the amount of catalyst that flows into the annulus 104, a sealing system 122 is utilized between the outer shell 13 and the internal riser 75. Typically, the sealing system 122 includes a primary seal 124 and a secondary seal 126. The secondary seal 126 is disposed above (i.e., at a higher vertical level) the primary seal 124. The primary seal 124 may comprise, for example, an expansion element, preferably an omega seal. See, e.g., U.S. Pat. No. 5,328,667.

Figure 3:
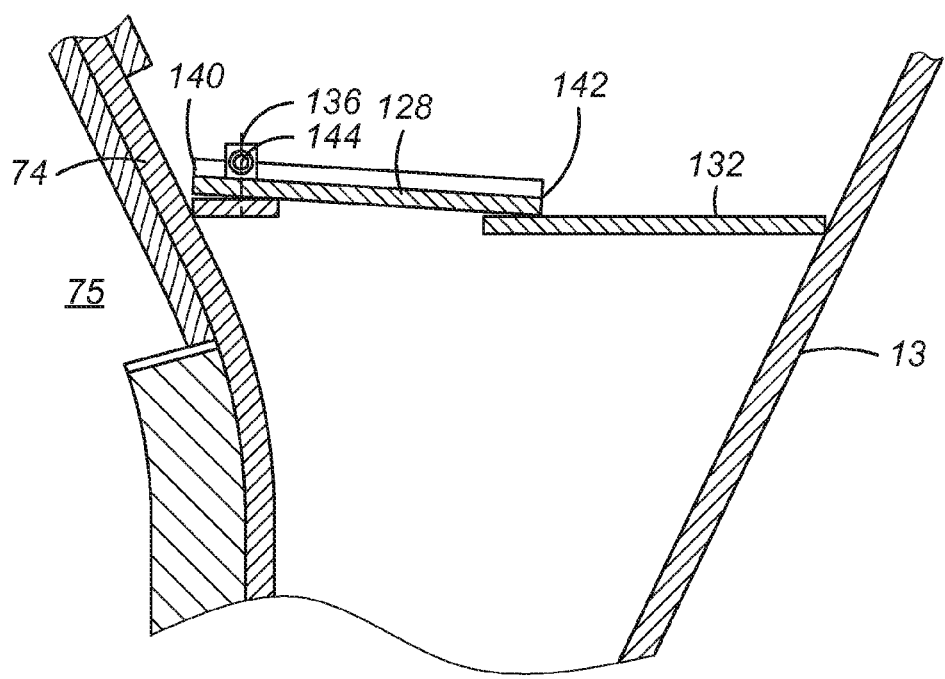
FIG. 3 is a side cutaway view of the sealing system of FIG. 2 showing the thermal expansion of the cone of the internal riser.
Figure 4:
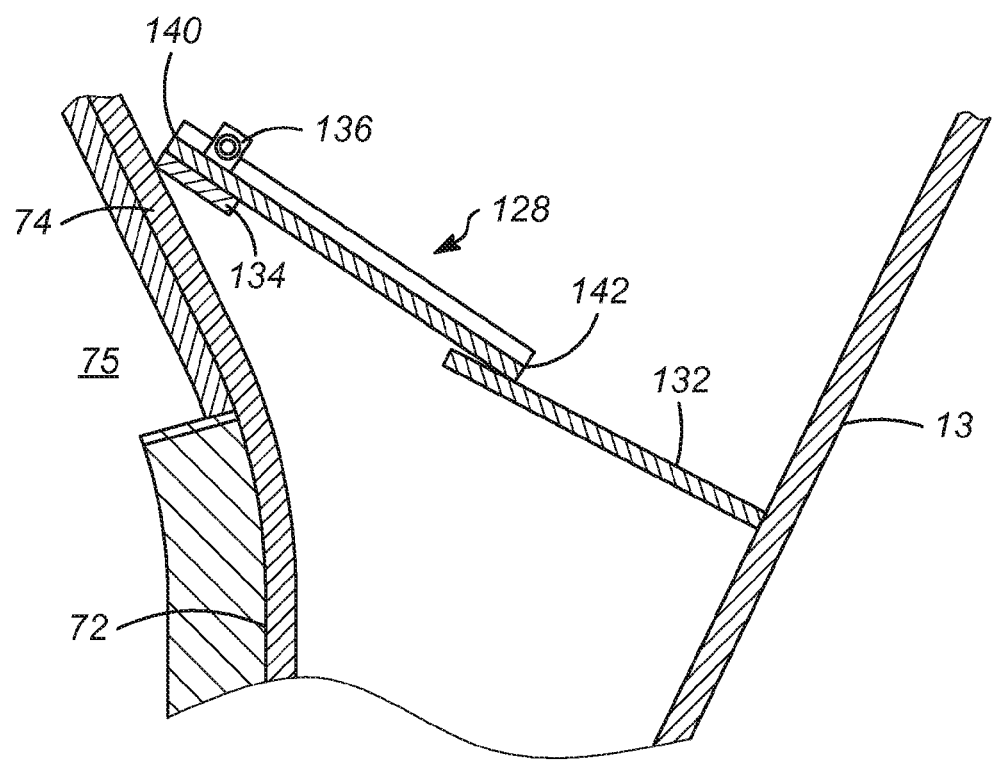
FIG. 4 is a side cutaway view of another sealing system according to one or more embodiments of the present invention.

With reference to FIGS. 2 to 4, in an embodiment the secondary seal 126 includes a sealing ring 128 which comprises at least one plate 130, and preferably a plurality of plates 130. The sealing ring 128 is preferably pivotable and can form a cone (FIG. 4) or be flat (FIGS. 2 and 3). In various embodiments, the sealing ring 128 can form a lap joint (i.e., overlap) with an outer support ring 132 which is secured to the inner surface 116 of the outer shell 13. The secondary seal 126 may also include an inner seal support ring 134 secured to the outer surface 120 of the riser 75.

In order to provide for a pivotable sealing ring 128, the inner seal support ring 134 may include one or more posts 136. Accordingly, the sealing ring 128 preferably includes an aperture 138 (see FIG. 5A) sized to receive a post 136. The aperture 138 is sized larger than the post 136 to allow for some movement between the post 136 and the sealing ring 128. For example, in one embodiment, the post 136 may have a diameter of 12 mm, and the aperture 138 may have a diameter of 22 mm. As will be appreciated, other sizes and shapes (slots, etc.) may be used. Additionally, other configurations may also be used to provide a pivotable, or moveable, sealing ring such as a hinge, or as discussed below.

Turning to FIG. 3, when the temperature of the internal riser 75 begins to increase (due to the temperature of the combustion occurring in chamber 68), the cone 74 of the internal riser 75 will expand upward and outward relative to the outer shell 13. An inner circumference 140 of the sealing ring 128 will pivot upward (with reference to the drawings) allowing an outer circumference 142 of the sealing ring 128 to maintain the lap joint with the outer support ring 132. This movement will allow the secondary seal 128 to inhibit the flow of catalyst in the annulus 104 and onto the primary seal 126. In order to avoid the sealing ring 128 from disengaging the post 136, the post 136 may include an aperture 144 for receiving a retaining element, such as a bolt (not shown).

In FIG. 4, as mentioned above an embodiment is shown in which the sealing ring 128 forms a cone. The remaining portions of this embodiment are similar to the one depicted in FIGS. 2 and 3.

As mentioned above, it is contemplated that the sealing ring 128 comprises a plurality of plates 130. In such a configuration, one or more plates 130 can be easily removed to allow for inspection of the primary seal 124 and recovery of the catalyst that has become trapped between the primary seal 124 and the secondary seal 126. Additionally, the use of multiple plates 130 will allow for move localized movement of the sealing ring 128, creating a better seal to limit the amount of catalyst flowing into the annulus 104. A preferred configuration of the plurality of plates is shown in FIGS. 5A to 5E.

Figure 5A:
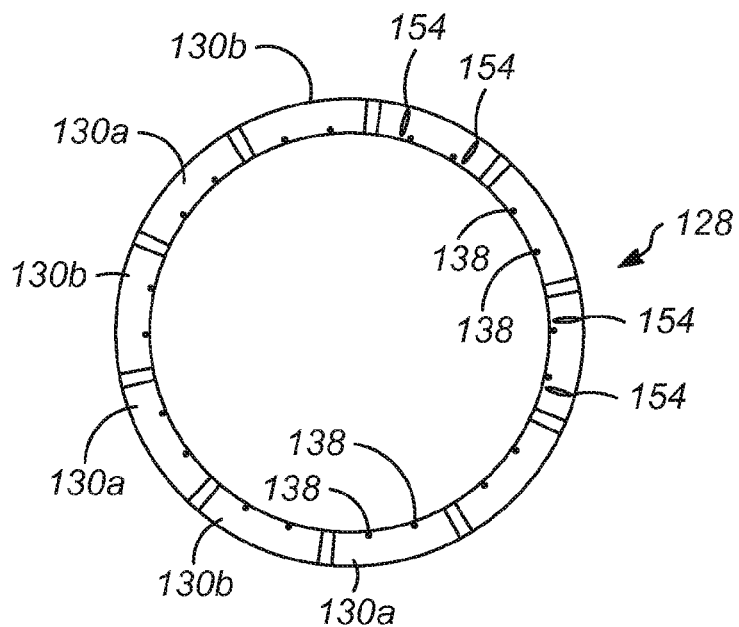
FIG. 5A is a top view of a sealing ring utilized with one or more sealing systems of the present invention.
Figure 5B:
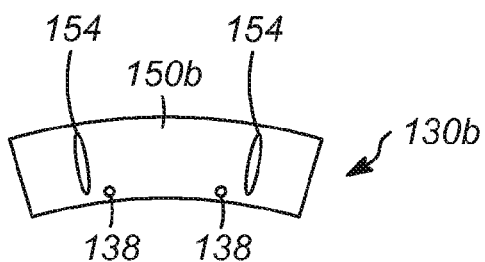
FIG. 5B is a top view of a first plate in the sealing ring shown in FIG. 5A.
Figure 5C:
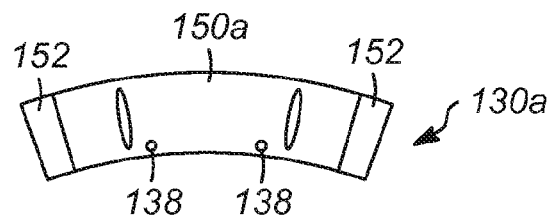
FIG. 5C is a top view of a second plate in the sealing ring shown in FIG. 5A.
Figure 5D:
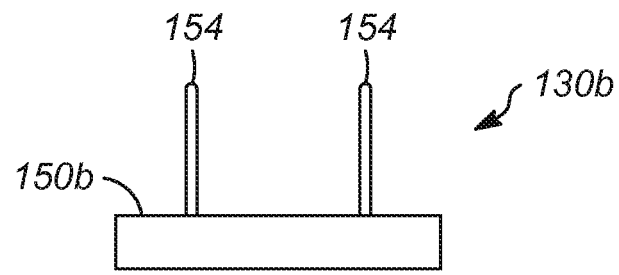
FIG. 5D is a side view of the plate shown in FIG. 5B.
Figure 5E:
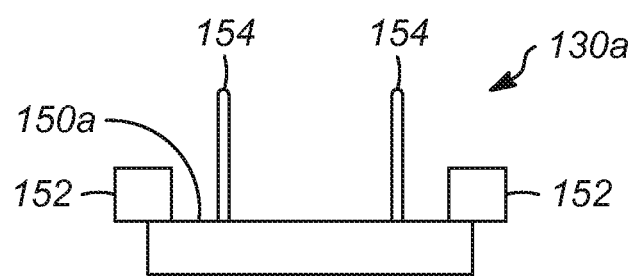
FIG. 5E is a side view of the plate shown in FIG. 5C.

In the depicted embodiment, as shown in FIG. 5A the sealing ring 128 comprises two versions of plates 130a, 130b that alternate to form the sealing ring 128. A first plate 130a (FIGS. 5C and 5E) comprises a center portion 150a and two wing portions 152, one on each end. A second plate 130b (FIGS. 5B and 5D) comprises only a center portion 150b. Both types of plates 130a, 130b may include apertures 138 for the posts 136 on the inner seal supporting ring 134.

As mentioned above, the plates 130a, 130b alternate to form the sealing ring 128, with the wing portions 152 of a first plate 130a forming lap joints with the top surfaces of the two second plates 130b that are adjacent to the first plate 130a (one at each end). Additionally, at least some of the plates 130a, 130b include one or more handles 154. The handles 154 can be used to lift individual plates 130 for inspection of the primary seal 124 or removal of catalyst. While the plates 130a, 130b are depicted as being flat, it is contemplated that they form a cone shaped sealing ring.

Figure 6A:
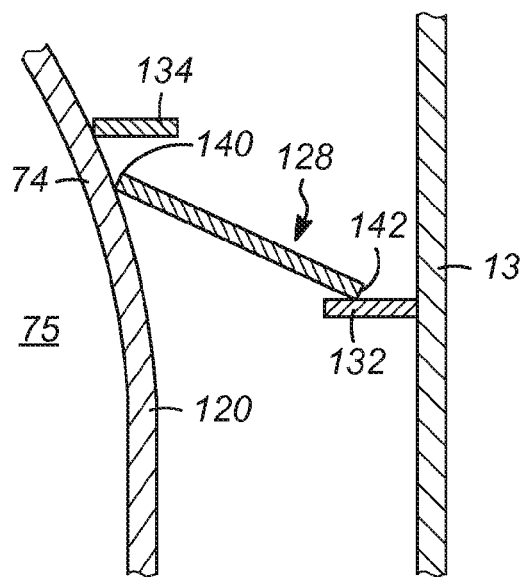
FIG. 6A is a side cutaway view of another sealing system according to one or more embodiments of the present invention.
Figure 6B:
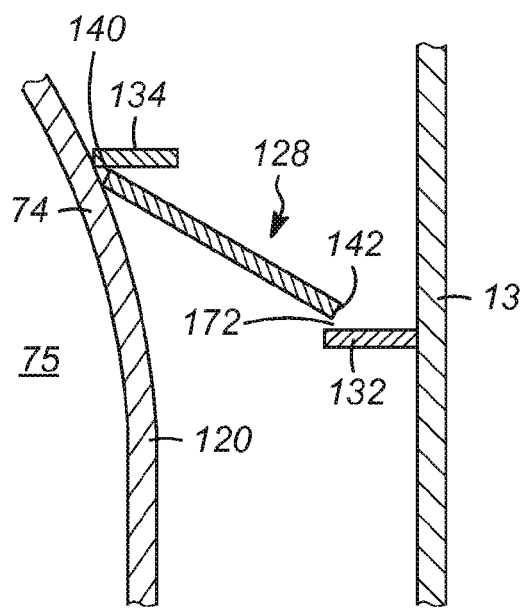
FIG. 6B is a side cutaway view of the sealing system of FIG. 6A showing the thermal expansion of the cone of the internal riser.

Turning to FIGS. 6A and 6B, another sealing ring 128 is shown which is movable relative to the riser 75. The sealing ring 128 can be a single piece or multiple pieces. The outer circumference 142 of the sealing ring 128 forms a lap joint with the outer support ring 132. As shown in FIG. 6A, the inner circumference 140 of the sealing ring 128 rests on the outer surface 120 of the internal riser 75, preferably on the cone 74, and forms a junction with the internal riser 75. When the temperature of the internal riser 75 increases (FIG. 6B), the cone 74 will expand, and the inner circumference 140 of the sealing ring 128 will slide upward (with reference to the drawings). This movement of the cone 74 will cause the sealing ring 128 to raise up off of the outer support ring 132, creating a gap 172 between the sealing ring 128 and the outer support ring 132. Preferably, the inner circumference 140 of the sealing ring 128 will form a lap joint with a bottom of the inner seal support ring 134.

Figure 7A:
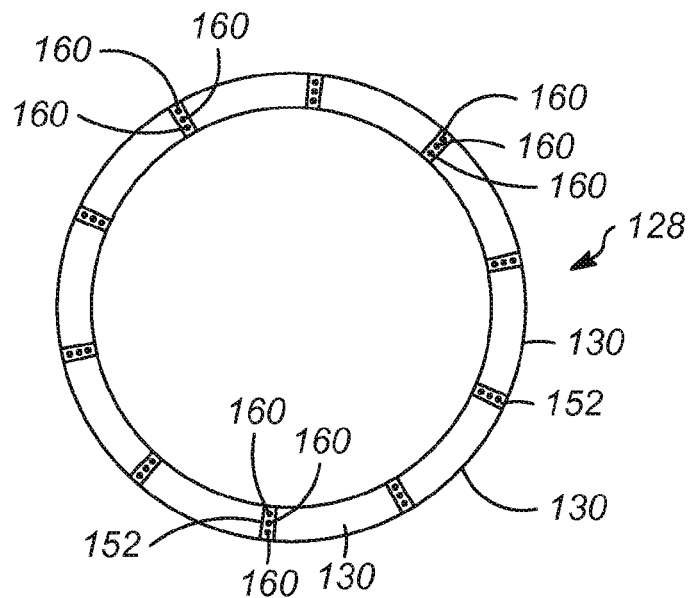
FIG. 7A is a top view of another sealing ring utilized with one or more sealing systems of the present invention.
Figure 7B:
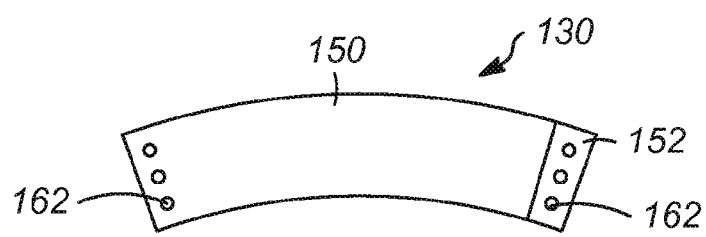
FIG. 7B is a top view of a plate in the sealing ring shown in FIG. 7A.
Figure 7C:
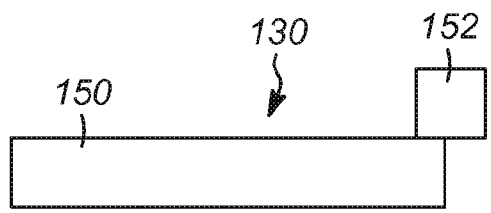
FIG. 7C is a side view of the plate shown in FIG. 7B.

Another embodiment of the present invention shown in FIGS. 7A to 7C in which the sealing ring 128 comprises a plurality of plates 130 which are secured to each other. The plates 130 may all have the same form, with a center portion 150 and a wing 152 at one end. The wing 152 of each plate 130 will form a lap joint with an adjacent plate 130. Alternatively, the plates may comprise two versions (like the embodiment of FIGS. 5A-5E above). Other configurations may also be used.

In any configuration, in this embodiment of the present invention, the plates 130 are held together with a plurality of fasteners 160. The fasteners 160 extend through slotted openings 162 in the plates 130 which are sized larger than the fasteners 160 to provide the sealing ring 128 with movement and flexibility to adjust to localized temperature variations and catalyst accumulation. The sealing ring 128 of this embodiment can be used in association in the sealing systems described herein.

Figure 8:
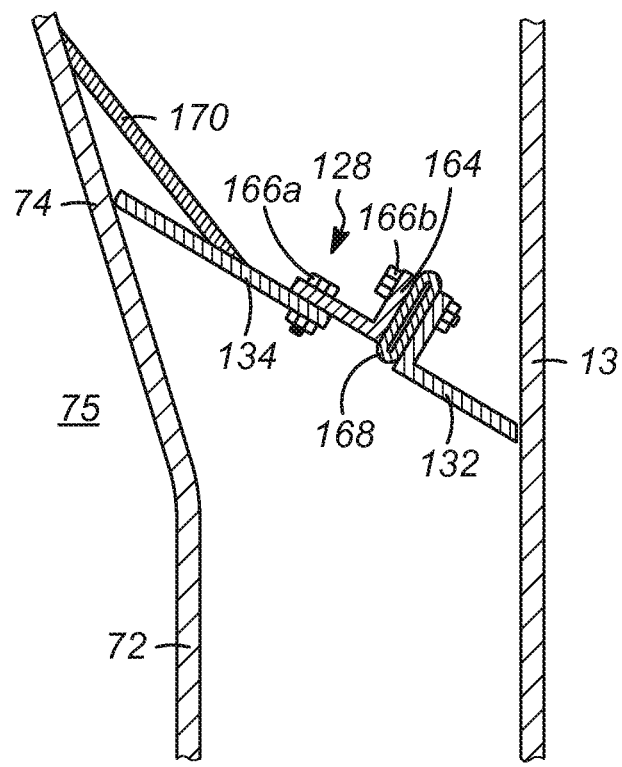
FIG. 8 is a side cutaway view of another sealing system according to one or more embodiments of the present invention.

In yet another embodiment, shown in FIG. 8, the sealing ring 128 may include an outer flange 164 along the outer circumference. The flange may have an angle that is greater than 90°.

As shown, the sealing ring 128 may be secured to the inner seal support ring 134 and the outer flange 164 may be secured to the outer seal support ring 132. The inner seal support ring 134 can receive a fastener 166a to secure the inner seal support ring 134 to the sealing ring 128. Likewise, the outer support ring 132 can receive a fastener 166b to secure the outer flange 164 thereto. Preferably, an expansion element 168, such a ceramic fiber filled braided hose, is disposed between the outer flange 164 and the outer support ring 132. The expansion element 168 will allow for the sealing ring 128 to pivot and move in response to the expansion of the riser 75. Additionally, although not shown, apertures used in association with fasteners 166a, 166b may be sized to allow for movement between the pieces secured thereby (i.e., they may be larger or may be slots). Finally, one or more gussets 170 may be installed to support the inner seal support ring 134.

It should be appreciated by those of ordinary skill in the art that the above described embodiments or portions thereof may be combined in any manner.

Therefore, in one or more embodiments, the present invention provides a sealing system that adequately accommodates the high temperature and movement of the riser, while providing an effective seal to minimize the amount of catalyst that flows into the annulus on top of the primary sealing element. Additionally, one or more embodiments provide a sealing system that allows the secondary seal to be easily partially (or completely) disassembled to allow for inspection of the primary seal, as well as to allow for recovery of the catalyst that has flowed into the annulus on top of the primary seal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A regenerator for regenerating catalyst from an FCC reactor, the regenerator comprising:
   an internal riser comprising a cone and a cone skirt,
   a shell surrounding the internal riser and forming an annulus between an outer surface of the riser and an inner surface of the shell, a bottom of the cone skirt being secured to the shell;
   a primary seal disposed in the annulus between the internal riser and the shell; and,
   a secondary seal disposed above the primary seal, wherein the secondary seal comprises a sealing ring including at least one pivotable plate.

2. The regenerator of claim 1 wherein the sealing ring forms a cone.

3. The regenerator of claim 1 wherein the sealing ring forms a plate.

4. The regenerator of claim 1 wherein the secondary seal further comprises an outer seal support ring secured to the inner surface of the shell, the outer seal support ring forming a lap joint with the at least one pivotable plate.

5. The regenerator of claim 4 wherein the secondary seal further comprises an inner seal support ring secured to the outer surface of the riser.

6. The regenerator of claim 5, wherein the inner seal support ring comprises at least one post.

7. The regenerator of claim 6, wherein the at least one pivotable plate includes an aperture to receive the at least one post, and wherein the at least one post forms a pivot for the at least one pivotable plate.

8. The regenerator of claim 7 wherein the inner seal support ring includes plurality of posts, and wherein the secondary seal comprises a plurality of plates, each plate with an aperture to receive a post.

9. The regenerator of claim 1 wherein the at least one pivotable plate includes at least one handle.

10. A regenerator for regenerating catalyst from an FCC reactor, the regenerator comprising:
   an internal riser comprising a cone and a cone skirt,
   a shell surrounding the internal riser and forming an annulus between an outer surface of the internal riser and an inner surface of the shell, a bottom of the cone skirt being secured to the shell;
   a primary seal disposed in the annulus between the internal riser and the shell; and,
   a secondary seal disposed above the primary seal, the secondary seal comprising a sealing ring formed with a plurality of plates and an inner seal support ring secured to the outer surface of the riser, wherein the plates and the inner support seal form a lap joint.

11. The regenerator of claim 10 wherein the plates from the plurality of plates are fastened together in a moveable relationship.

12. The regenerator of claim 10, wherein the plates form lap joints with adjacent plates.

13. The regenerator of claim 12 wherein the plates form a cone.

14. The regenerator of claim 12, wherein at least one of the plates includes at least one handle.

15. The regenerator of claim 10, wherein the secondary seal further comprises an outer seal support ring secured to the inner surface of the shell, the outer seal support ring forming a lap joint with the plates.

16. The regenerator of claim 15 wherein the inner seal support ring is disposed on the outer surface of the internal riser so that an inner circumference of the sealing ring forms a lap joint with the internal riser.

17. The regenerator of claim 15 wherein the inner seal support ring is disposed on the outer surface of the internal riser to form a lap joint with a bottom surface of the sealing ring.

18. The regenerator of claim 16 wherein the plates of the sealing ring includes an annular flange.

19. The regenerator of claim 18 wherein the plates of the sealing ring are secured to the inner seal support ring and wherein the flanges of the plates are secured to the outer seal support ring.

20. The regenerator of claim 19 wherein the flange of the sealing ring and the outer seal support ring are secured with a fastener and an elastic member is disposed between the flange and the outer seal support ring.

* * * * *